Nov. 2, 1926.
1,605,589
J. H. HUNT
CRANKSHAFT VIBRATION DAMPER
Filed Nov. 10, 1924
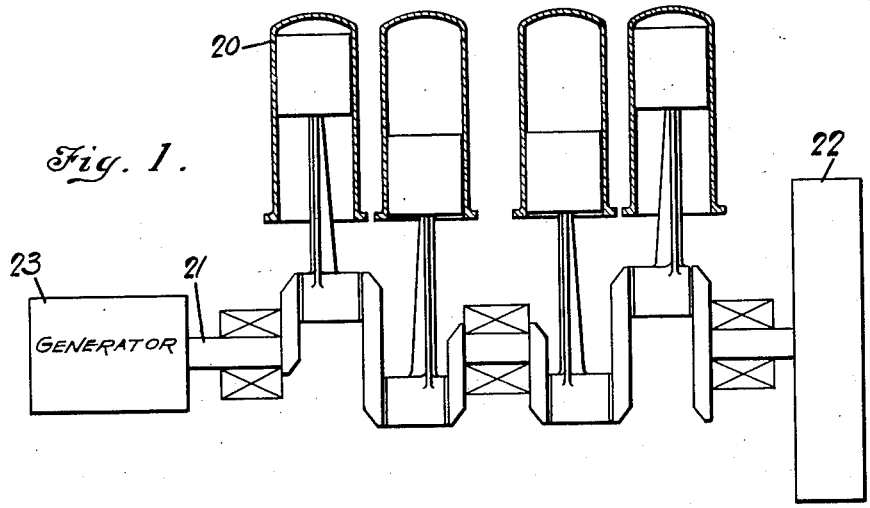
Fig. 1.
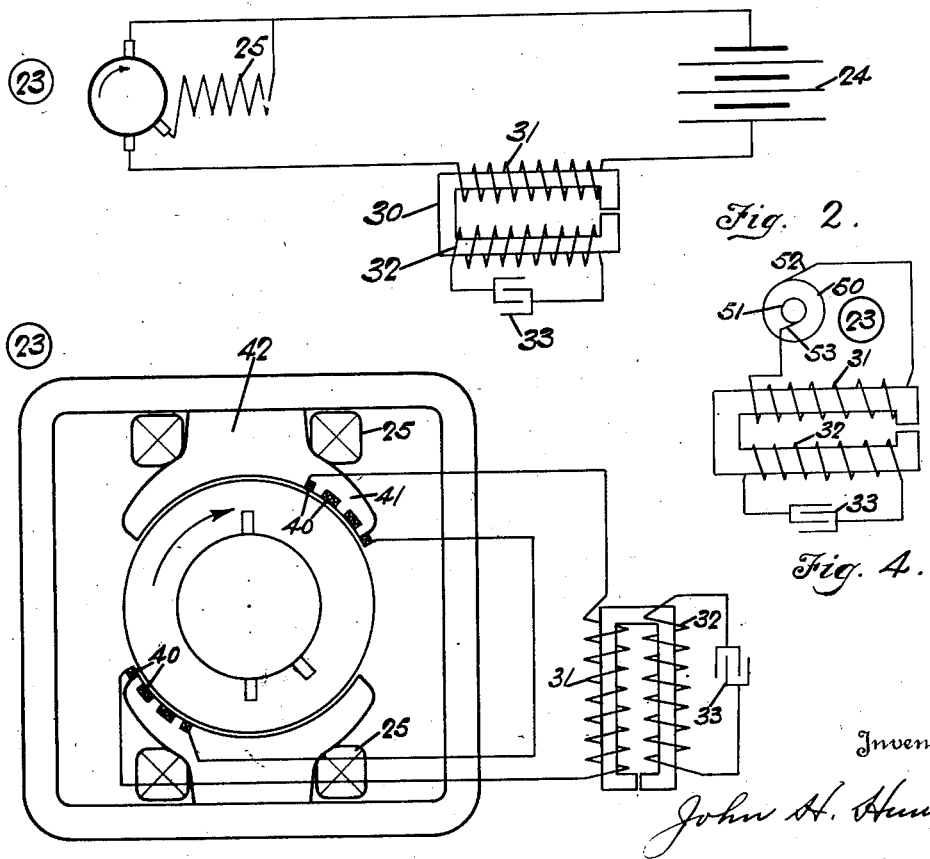
Fig. 2.
Fig. 3
Fig. 4.
Inventor
John H. Hunt
By Spencer Small and Hardman
his Attorneys Patented Nov. 2, 1926.

1,605,589

UNITED STATES PATENT OFFICE.

JOHN H. HUNT, OF DAYTON, OHIO, ASSIGNOR TO GENERAL MOTORS RESEARCH CORPORATION, OF DAYTON, OHIO, A CORPORATION OF DELAWARE.

CRANKSHAFT-VIBRATION DAMPER.

Application filed November 10, 1924. Serial No. 748,816.

This invention relates to the dampening of engine crankshaft vibrations, and includes among its objects a method of and apparatus for preventing sustained torsional oscillations in an engine crankshaft when running.

Further objects and advantages of the present invention will be apparent from the following description, reference being had to the accompanying drawings, wherein a preferred form of embodiment of the present invention is clearly shown.

In the drawings, Fig. 1 is a diagram of an engine having applied thereto a generator included in the vibration dampening apparatus of the present invention. Figs. 2, 3 and 4 are wiring diagrams illustrating different forms of the invention.

Referring to the drawings, an engine having a plurality of cylinders 20 operates a crankshaft 21 having one end attached to a flywheel 22, and the opposite end directly attached to the rotor of a generator 23.

The method, included in the present invention, for preventing sustained torsional oscillation of an engine crankshaft consists in translating the energy of the torsional oscillations of the crankshaft when running at a critical speed, into an oscillating electrical current having a frequency corresponding to the frequency of the torsional oscillations of the crankshaft, and in opposing by electro-magnetic means the generation of said oscillations of current. By critical speed is meant that the frequency of the impulses delivered by the pistons to the crankshaft is the same or a factor or multiple of the natural frequency of torsional vibration of the crankshaft and flywheel. At the critical speed the generator rotor will be rapidly accelerated and decelerated as it rotates, thereby causing the generation of an oscillating current in its inductors.

Fig. 2 illustrates a circuit in which the generator 23 is used to charge a storage battery 24, and is provided with a shunt-exciting field 25 and third-brush regulation common in storage battery charging systems for automobiles propelled by internal-combustion engines. The inductor windings in which the oscillating currents are generated are the usual armature windings as indicated in Fig. 2. The step of electro-magnetically opposing the generation of these oscillations of current is accomplished by placing in the circuit of said oscillating current an inductively-related resonant circuit having a natural frequency equal to the natural frequency of torsional oscillation of the crankshaft. There is provided a transformer core 30 carrying a primary winding 31 in the battery charging circuit which transmits the oscillations of current in the inductor windings of the generator. The core 30 carries a secondary winding 32 inductively related to the winding 31, and the terminals of this winding are connected with a condenser 33. The circuit of the winding 32 and the condenser 33 is known as a resonant circuit and is tuned to a natural frequency equal to the natural frequency of crankshaft oscillation. The oscillations of electrical current in the winding 31 will cause pulsations of current to be induced in the winding 32. When the frequency of these oscillations is the same as the natural frequency of the resonant circuit including the secondary winding 32 and condenser 33, the resonant circuit will react upon the inductors of the generator in such a manner that part of the energy normally existing in the torsional vibrations will be absorbed electromagnetically.

Fig. 3 shows a generator provided with special windings 40 located in the trailing tips 41 of the pole pieces 42 of the generator. These windings are connected so that their E. M. F.'s are cumulative. One advantage of locating the pole face windings in this manner is that the trailing pole tips are highly saturated even at high engine speed, due to flux distortion, particularly when using third-brush regulation. The windings 40 are connected together in series with a transformer winding 31.

Fig. 4 shows a form of the invention in which the regular armature windings are connected to slip rings 50 and 51 cooperating with brushes 52 and 53 which are connected with the transformer winding 31. The generator armature could be provided with special windings independent of the regular windings which are connected with the slip rings 50 and 51.

While the form of embodiment of the invention as herein disclosed, constitutes a preferred form, it is to be understood that other forms might be adopted, all coming within the scope of the claims which follow.

What is claimed is as follows:

1. The method of preventing the crankshaft of an engine from building up a sustained torsional oscillation when running, which consists in translating the energy of the torsional oscillations into an oscillating electrical current having a frequency corresponding to the frequency of torsional oscillation of the crankshaft at the critical speed of rotation thereof, and in electro-magnetically opposing the generation of said oscillations of current.

2. The method of preventing the crankshaft of an engine from building up a sustained torsional oscillation when running, which consists in translating the energy of the torsional oscillations into an oscillating electrical current having a frequency corresponding to the frequency of torsional oscillation of the crankshaft at the critical speed of rotation thereof, and in opposing the generation of said oscillating current by means of a resonant circuit inductively related to the circuit of said oscillating circuit and having a natural frequency equal to the frequency of crankshaft torsional oscillation.

3. Apparatus for preventing sustained torsional oscillation in an engine crankshaft when running comprising, in combination, means for translating the energy of the torsional oscillations into an oscillating electrical current, and means for electro-magnetically opposing the generation of the oscillations of current.

4. Apparatus for preventing sustained torsional oscillation in an engine crankshaft when running comprising, in combination, means for translating the energy of the torsional oscillation into an oscillating electrical current, and a resonant circuit inductively related to the circuit of the oscillating current and having a natural frequency equal to the frequency of crankshaft torsional oscillation.

5. Apparatus for preventing sustained torsional oscillation in an engine crankshaft when running comprising, in combination, a generator having a rotor connected directly to one end of the crankshaft and having windings in which oscillations of current are generated by the crankshaft torsional oscillation, and a resonant circuit inductively related to the circuit of the oscillating current and having a natural frequency equal to the frequency of crankshaft torsional oscillation.

6. Apparatus for preventing sustained torsional oscillation in an engine crankshaft when running, comprising, in combination, means for translating the energy of the torsional oscillation into an oscillating electrical current, and a resonant circuit connected to the circuit of the oscillating current and having a natural frequency equal to the frequency of crankshaft torsional oscillation.

7. The combination of an internal combustion engine including a rotating system having a natural period of torsional vibration, an electrical system having a natural frequency of oscillation approximating the natural frequency of the rotating system, and means for transferring the energy of said torsional vibration into electric energy acting in said electrical system.

8. The method of damping out torsional vibrations in the crankshaft of an engine which consists in providing a resonant circuit having a frequency approximating the natural frequency of vibration of the crankshaft, and in transferring the energy of said vibrations into electric energy acting in said circuit.

In testimony whereof I hereto affix my signature.

JOHN H. HUNT.